United States Patent
Koerner et al.

(10) Patent No.: US 10,242,073 B2
(45) Date of Patent: Mar. 26, 2019

(54) ANALYTICS MEDIATION FOR MICROSERVICE ARCHITECTURES

(71) Applicant: SAP SE, Walldorf (DE)

(72) Inventors: Dennis Koerner, Karlsdorf-Neuthard (DE); Andreas Linke, Rauenberg (DE)

(73) Assignee: SAP SE, Walldorf (DE)

( * ) Notice: Subject to any disclaimer, the term of this patent is extended or adjusted under 35 U.S.C. 154(b) by 303 days.

(21) Appl. No.: 15/221,009

(22) Filed: Jul. 27, 2016

(65) Prior Publication Data
US 2018/0032534 A1   Feb. 1, 2018

(51) Int. Cl.
*G06F 17/30* (2006.01)

(52) U.S. Cl.
CPC .............. *G06F 17/30545* (2013.01)

(58) Field of Classification Search
USPC .................................. 707/728, 738
See application file for complete search history.

(56) References Cited

U.S. PATENT DOCUMENTS

2017/0242784 A1 * 8/2017 Heorhiadi ........... H04L 41/5038

* cited by examiner

*Primary Examiner* — Hung T Vy
(74) *Attorney, Agent, or Firm* — Mintz Levin Cohn Ferris Glovsky and Popeo, P.C.

(57) ABSTRACT

An analytics mediator facilitates operations of an analytics engine and a corresponding analytics user interface (UI) in analyzing operations of a plurality of microservices. The analytics mediator enables the analytics engine to execute various types of conventional and new types of analyses with respect to the microservices, and to present the results of such analyses using the analytics UI, in a manner that is highly convenient and efficient for a user of the analytics engine, while also maintaining an independence, scalability, and other advantageous features of the microservices.

16 Claims, 6 Drawing Sheets

ANALYTICS MEDIATION FOR MICROSERVICE ARCHITECTURES

TECHNICAL FIELD

This description relates to microservice architectures.

BACKGROUND

Traditional software applications often utilize one or more databases to provide a number of functions and services for corresponding software applications. A given database can be made consistent across all aspects of its corresponding software application, and such applications can be scaled horizontally by providing application instances on a number of platforms (e.g., running instances on a plurality of servers, using a load-balancer).

Microservice architectures take an approach in which application functions and services are deployed in a much more granular fashion using microservices, and larger application goals are reached using interactions between such microservices. For example, each of a number of microservices might provide a particular function or service, and each such microservice might interact with (e.g., input from, or output to) at least one other microservice.

In practice, interfaces between microservices are typically maintained in a consistent, predictable fashion. Accordingly, it should be straightforward for one microservice to interact with another microservice, even if the microservices have not previously interacted. Nonetheless, as long as such interface consistency is maintained, it is possible for each microservice to be developed and updated in a manner that is otherwise independent from other microservices. For example, data formatting used by a particular microservice might be updated without notifying other microservices.

DETAILED DESCRIPTION

Figure 1:
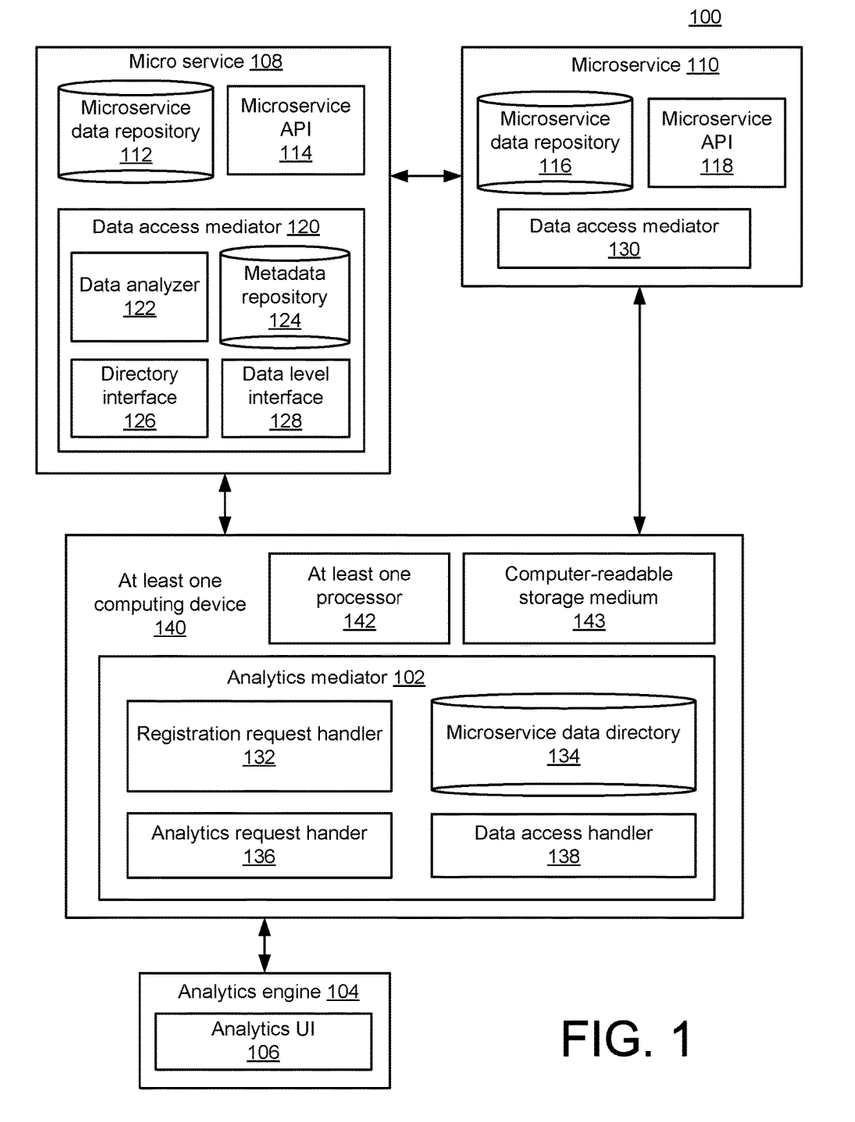
FIG. 1 is a block diagram of a system for analytics mediation for a microservice architecture.

FIG. 1 is a block diagram of a system 100 for analytics mediation for a microservice architecture. In the example of FIG. 1, an analytics mediator 102 is configured to facilitate operations of an analytics engine 104 (and a corresponding analytics user interface (UI) 106) in analyzing operations of a plurality of microservices, represented in the example of FIG. 1 by a microservice 108 and a microservice 110. More specifically, and as described in more detail below, the analytics mediator 102 enables the analytics engine 104 to execute various types of conventional and new types of analyses with respect to the microservices 108, 110, and to present the results of such analyses using the analytics UI 106, in a manner that is highly convenient and efficient for a user of the analytics engine 104, while also maintaining an independence, scalability, and other advantageous features of the microservices 108, 110.

In the example of FIG. 1, the analytics engine 104 may be understood to represent virtually any conventional or new analytics engine that might be used in conjunction with performing data analytics with respect to the microservices 108, 110. In this regard, it will be appreciated that such data analytics generally refer to the computer science techniques of examining raw data, generally for the purpose of making interpretations or drawing conclusions regarding the data, and/or for making future decisions or predictions regarding the nature or use of such data. Therefore, such data analytics may be used, for example, to research potential trends, evaluate a performance of a particular microservice, or otherwise determine how best to gather and utilize specific types of data. Such analytics may be implemented using any number of known statistical techniques in conjunction with other types of iterative explorations of selected data sets. Results of such analyses may be provided to a user of the analytics engine 104 using the analytics UI 106, including using virtually any suitable type of known or future UI component to visually and/or texturally present details regarding implementations and results of desired types of data analysis.

Thus, it will be appreciated that techniques for requesting, specifying, obtaining, and utilizing various types of data analytics might be used in the example of the system 100 of FIG. 1. In particular, for example, existing analytics tools, such as the Web Intelligence analytics tool of SAP SE of Waldorf, Germany, may be utilized. Specifically, in the example of FIG. 1, the analytics mediator 102 facilitates operations of any appropriate analytics engines in performing desired types of data analyses with respect to the microservices 108, 110, while minimizing or eliminating potential adverse effects on operations or features of the microservices 108, 110 in conjunction therewith.

In this regard, the microservice 108, as well as the microservice 110, should generally be understood to represent virtually any specialized software service designed to provide one or more particular functions intended to be combined with one or more functions provided by other, similar applications. Thus, it will be appreciated that implementations may be provided in which the exact term microservice is not specifically used, and other, related terminologies and/or programming paradigms may be utilized to implement the system 100 of FIG. 1, such as a service-oriented architecture (SOA), as long as such implementations utilize the various features and aspects described and/or claimed herein.

For example, the microservice 108 is illustrated as including a microservice data repository 112, as well as a microservice application programming interface (API) 114. That is, as described herein, the microservice 108 is designed to execute its own process and/or logic, using data from the microservice data repository 112 and other inputs received by way of the microservice API 114, while providing outputs by way of the microservice API 114, as well. Meanwhile, similarly, the microservice 110 utilizes its own microservice data repository 116 and microservice API 118. Although not specifically illustrated in the simplified example of FIG. 1 for the sake of clarity and conciseness, it will be appreciated that one or more additional microservices may be executed in conjunction with the microservices 108, 110 in order to provide aggregated outputs and other goals or objectives, and that operations of the analytics mediator 102 may be executed with respect to all such combinations of available microservices.

Thus, each such microservice effectively encapsulates its individual data with corresponding processes and logic operating thereon, while restricting access thereto through the use of a corresponding, public service interface. By restricting data access and data sharing in this manner, as referenced above, it is possible to upgrade or otherwise update each individual microservice, without necessarily performing similar or corresponding updates to data or operations of any other microservice.

Accordingly, a developer of a particular microservice may be enabled to update that microservice at virtually any desired time, and using any available technique. As a result, the type of microservice architecture described with respect to FIG. 1 may be particularly useful for enabling support for a wide range of devices and/or platforms, including cloud-based deployements. For example, such platforms may include web-based or mobile platforms, wearable devices, internet of things (JOT) devices, large scale enterprise applications, and many other settings and context, even when the developer is not necessarily aware of, or knowledgeable about, the types of the devices that may be supported.

As a result of these and other features of the types of microservice architectures described herein, little or no centralized management of the microservices may be required, and implementation details of each microservice may be largely or completely independent of implementation details used for other microservices. For example, different programming languages may be used, and different data storage technologies or techniques may be used, as well, including an ability to select the specific database technologies that may be optimal for implementation of functions and services provided by a corresponding microservice. For example, different database technologies may be used in scenarios in which a microservice is used primarily to search queries, as compared to scenarios in which a high speed, high performance database is required.

With respect to the microservice APIs 114, 118, it will be appreciated that such APIs may be implemented in a manner that facilitates a search, discovery, and use of each corresponding microservice by other microservices, and users thereof. For example, the microservice API 114 may be implemented as a representational state transfer (REST) API, which may be accessed using the hypertext transfer protocol (HTTP), in a manner similar to a standard web page. In practice, any suitable communication protocol may be used, as long as the APIs provide the type of language-agnostic interactions described herein with respect to enabling the microservices 108, 110 to provide the type of decoupled, focused, modular application components described herein, to thereby obtain (in the aggregate) complex application functionality, in a continuously, independent, and automatically deployable architecture.

Unfortunately, many of the features and advantages of the microservices 108, 110 just described may be restrictive with respect to operations of the analytics engine 104. In particular, for example, the maintenance and use of the private microservice data repositories 112, 116, and independent, relatively frequent updates thereof, may restrict or eliminate an ability of the analytics engine 104 to provide individual or aggregated analysis of the stored data.

Therefore, in order to facilitate execution of analytics by the analytics engine 104, the microservice 108 is provided with a data access mediator 120. As explained in detail below, the data access mediator 120 is configured to interact with the analytics mediator 102, in order to provide efficient and useful access to data within the microservice data repository 112.

In more detail, for example, at a creation or instantiation of the microservice 108, or during subsequent upgrades or other updates of the microservice 108, a data analyzer 122 of the data access mediator 120 may be configured to analyze data within the microservice data repository 112. More specifically, for example, the data analyzer 122 may be configured to determine various characteristics or aspects of the data, e.g., regarding content of the data, formatting or structure of the data, or access techniques for accessing the data.

Results of the data analysis performed by the data analyzer 122 may be utilized to populate a metadata repository 124. That is, for example, upon an initial deployment of the microservice 108, the data analyzer 122 may analyze data within the microservice data repository 112, and populate the metadata repository 124 with the types of metadata just referenced. Upon subsequent additions or alterations of the microservice data repository 112, such as may occur in the context of an upgrade or other update to the microservice 108, the data analyzer 122 may update the metadata repository 124 with the corresponding additions or alterations.

Of course, data stored within the microservice data repository 112 may change frequently, as part of normal operations of the microservice 108. It is not necessary to reflect such normal changes in content of the data for purposes of the metadata repository 124. Instead, as described in detail herein, the metadata repository 124 may be utilized to store characteristics or attributes of the data, including structures used to store the data, and access techniques used to access the data, as well as characterizations of a nature or type of the content.

In response to changes made within the metadata repository 124, a directory interface 126 may be configured to report any such changes to the analytics mediator 102, as described in more detail below. For purposes of understanding operations of the data access mediator 120, it will be appreciated that the directory interface 126 effectively provides information to the analytics mediator 102, e.g., to identify, search, specify, analyze, access, and retrieve desired data from the microservice data repository 112, and thereby enable operations of the analytics engine 104 in analyzing such data.

In particular, as shown, the data access mediator 120 includes a data level interface 128, through which the analytics mediator 102 may be configured to execute the types of data access just referenced. In other words, the directory interface 126 may be understood to provide techniques for accessing virtually any desired data within the microservice data repository 112, where such access techniques are provided in a manner that is generally agnostic with respect to actual contents of the data that might be accessed, and are generally provided to the analytics mediator 102 in association with updates to the microservice 108 (or other changes made with respect to the metadata repository 124). Meanwhile, the data level interface 128 is configured to actually execute specific types of data access for specific contents of the microservice data repository 112, utilizing relevant portions of the metadata repository 124, as obtained by way of the directory interface 126.

In practice, all relevant microservices for which the analytics engine 104 might perform analysis may be outfitted with a data access mediator providing the various features and functions just described with respect to the data access mediator 120 of the microservice 108. Thus, for example, the example microservice 110 is illustrated as including a data access mediator 130. Of course, although not specifically illustrated in the simplified example of FIG. 1, many other microservices, each capable of communicating with one another through their respective public interfaces (such as the interfaces 114, 118 of FIG. 1) may be provided with corresponding data access mediators in communication with the analytics mediator 102.

At the analytics mediator 102, a registration request handler 132 may be configured to receive registration requests from the various data access mediators 120, 130. That is, as described, the registration request handler 132 will receive updates from, e.g., the directory interface 126, reporting changes to the metadata repository 124.

All such changes for the metadata repository 124, and other metadata repositories associated with other data access mediators of other microservices, may be stored within a microservice metadata directory 134. In other words, example implementations of the microservice metadata directory 134 may be understood to represent an aggregated or compiled collection of metadata from the various metadata repositories of the various data access mediators. As such, and as already described above with respect to the metadata repository 124, the microservice metadata directory 134 may be configured to store information characterizing attributes of the various microservice data repositories (e.g., repositories 112, 116), including the various available manners in which the data is stored and accessed.

An analytics request handler 136 may thus be configured to utilize the microservice metadata directory 134, in order to facilitate analytics requests received from the analytics engine 104. In other words, for example, upon receipt of a request from the analytics engine 104 for a particular type of analysis to be performed with respect to the microservices 108, 110, the analytics request handler 136 may be configured to access the microservice metadata directory 134 to retrieve relevant information regarding the manners in which data is stored, structured, formatted, and accessed in each of the microservices 108, 110, as previously determined from corresponding, respective data access mediators 120, 130.

Utilizing the retrieved, relevant metadata, a data access handler 138 may proceed to access and otherwise retrieve data specified as being relevant to the analytics request received by the analytics request handler 136. More specifically, as may be appreciated from the above description of the data access mediator 120, the data access handler 138 may interface with the data level interface 128 of the microservice 108 (as well as with a similar data level interface of the data access mediator 130 of the microservice 110), in order to identify, access, and retrieve the specified data.

In this way, the analytics engine 104 may be provided with current, up-to-date data that is useful in fulfilling the original analytics request of the analytics engine 104. In particular, it will be appreciated that it is not necessary to replicate, perform any consistency check, or update or maintain the data being access, beyond that which is required or helpful for normal operations of the corresponding microservice. Instead, through the use of the analytics mediator 102, the analytics engine 104 is provided with access to the actual data of each microservice, and can therefore perform a full range of data analytics directly thereon. At the same time, in the system 100, it remains possible to update a specific microservice, e.g., the microservice 108, independently of potential updates to other microservices (such as the microservice 110), even when the microservices 108, 110 are operating in conjunction with one another through their respective APIs 114, 118 to provide a combined or composite functionality.

In the example of FIG. 1, the analytics request mediator 102 is illustrated as being executed using at least one computing device 140, which itself is illustrated as including at least one processor 142, as well as a non-transitory computer readable storage medium 143. Thus, for example, it will be appreciated that the at least one computing device 140 may represent two or more computing devices in communication with one another, perhaps over a suitable network connection. Similarly, the at least one processor 142 should be understood to represent, in some implementations, two or more processors operating in parallel to provide the analytics mediator 102.

More generally, with respect to FIG. 1, it will be appreciated that any single component of the system 100 may be implemented as two or more sub-components operating in conjunction with one another. Similarly, but conversely, it may occur that two or more sub-components of the system 100 may be combined for operation as a single component or sub-component. For purposes of providing specific, non-limiting examples in this regard, it may occur that the interfaces 126, 128 may be implemented as a single application program interface. Further, although the analytics mediator 102 is illustrated as executing at the at least one computing device 140 and separately from the analytics engine 104, it also may occur that some or all of the analytics mediator 102 may be integrated with the analytics engine 104. In other example implementations, however, the analytics mediator 102 may specifically be configured to be separate from, but interoperable with, two or more different types of analytics engines.

Figure 2:
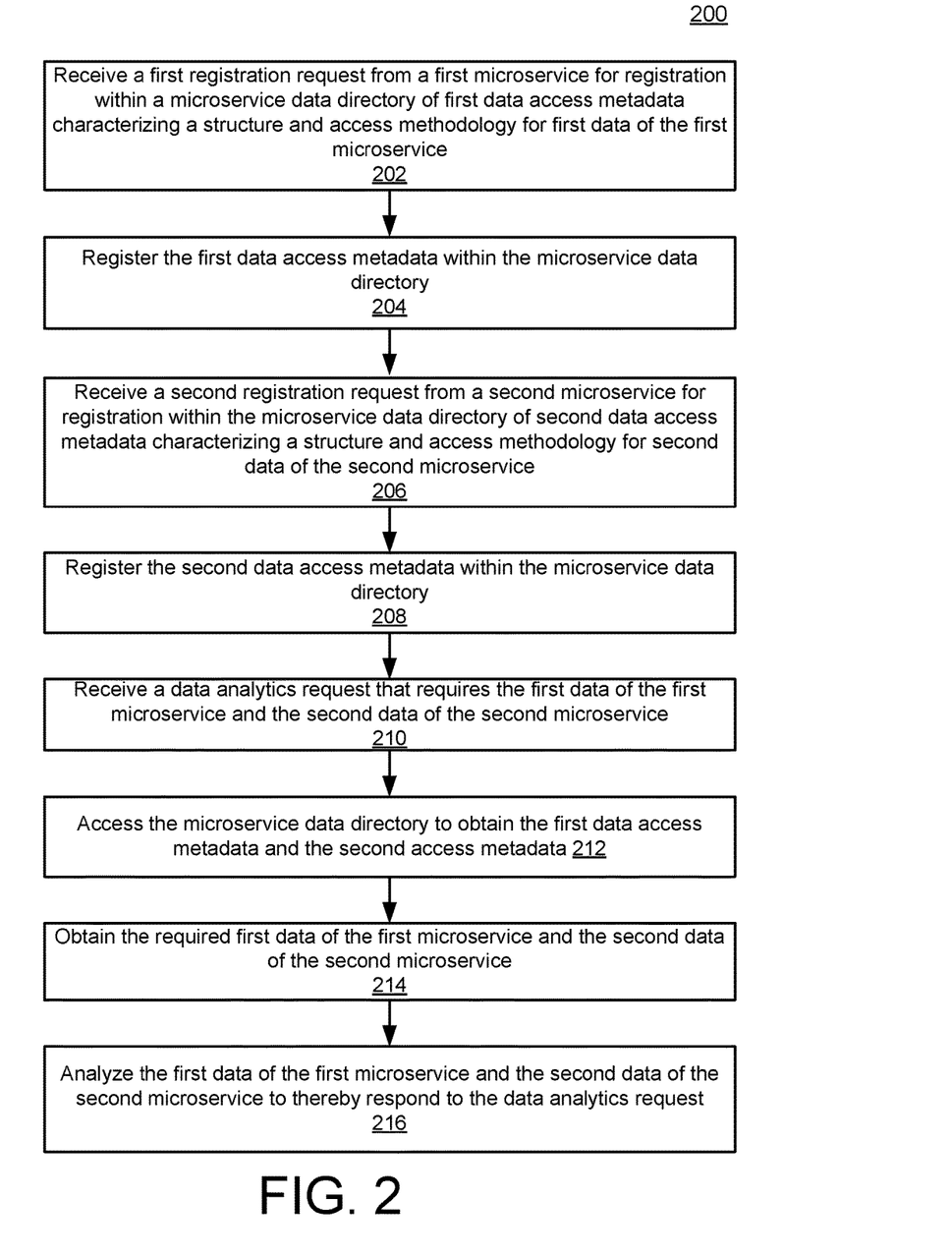
FIG. 2 is a flowchart illustrating example operations of the system of FIG. 1.

FIG. 2 is a flowchart 200 illustrating example operations 202-216 for the system 100 of FIG. 1. In the example of FIG. 2, the operations 202-216 are illustrated as separate, sequential operations. In various implementations, however, it will be appreciated that one or more additional or alternative operations or sub-operations may be included, and/or one or more operations or sub-operations may be omitted. In all such implementations, any two or more operations or sub-operations may be implemented in a completely or partially overlapping or parallel manner, or in a nested, iterative, looped, or branched fashion.

In the example of FIG. 2, a first registration request may be received from a first microservice for registration within a microservice data directory of first data access metadata characterizing a structure and access methodology for first data of the first microservice (202). For example, as described above, the registration request handler 132 of the analytics mediator 102 may receive a registration request from the data access mediator 120 of the microservice 108. In more detail, as also described above, the registration request handler 132 may receive, from the director interface 126, data access metadata stored in the metadata repository 124 by the data analyzer 122, the data access metadata of the metadata repository 124 characterizing a structure and access methodology for microservice data of the microservice data repository 112.

The first data access metadata may be registered within the microservice data directory (204). For example, the registration request handler 132 may proceed to store the first data access metadata for the microservice 108 within the microservice data directory 134.

Meanwhile, a second registration request may be received from a second microservice for registration within the microservice data directory of second data access metadata characterizing a structure and access methodology for second data of the second microservice (206). For example, the registration request handler 132 may receive, from the data access mediator 130 of the microservice 110, second data access metadata characterizing a structure and access methodology for microservice data stored within the microservice data repository 116 of the microservice 110.

The second data access metadata may be registered within the microservice data directory (208). For example, again, the registration request handler 132 may store the received second data access metadata within the microservice data directory 134.

A data analytics request may be received that requires the first data of the first microservice and second data of the second microservice (210). For example, the analytics request handler 136 may receive from the analytics engine 104 a data analytics request that requires data stored in both the microservice data repository 112 and the microservice data repository 116.

The microservice data directory may be accessed to obtain the first data access metadata and the second access metadata (212). For example, the analytics request handler 136 may access the microservice data directory 134 to obtain the previously-stored first data access metadata for the microservice 108 and the second data access metadata for the microservice 110.

The required first data of the first microservice and the second data of the second microservice may then be obtained (214). For example, the data access handler 138 may utilize the metadata obtained from the microservice directory 134 to interface with the data level interface 128 of the data access mediator 120, to thereby obtain access to the first data stored within the microservice data repository 112. Similarly, the data access handler 138 may interact with a similar data level interface (not explicitly illustrated in the example of FIG. 1) of the data access mediator 130, to thereby obtain the second data from the microservice data repository 116.

The first data of the first microservice and the second data of the second microservice may then be analyzed to thereby respond to the data analytics request (216). In the example of FIG. 1, the analysis of the first data and second data may be performed separately at the analytics engine 104. In other implementations, some or all of the data analysis may be performed at, or in conjunction with, the analytics mediator 102, so that results of such analyses may then be passed to the analytics engine 104 for display using the analytics UI 106.

Figure 3:
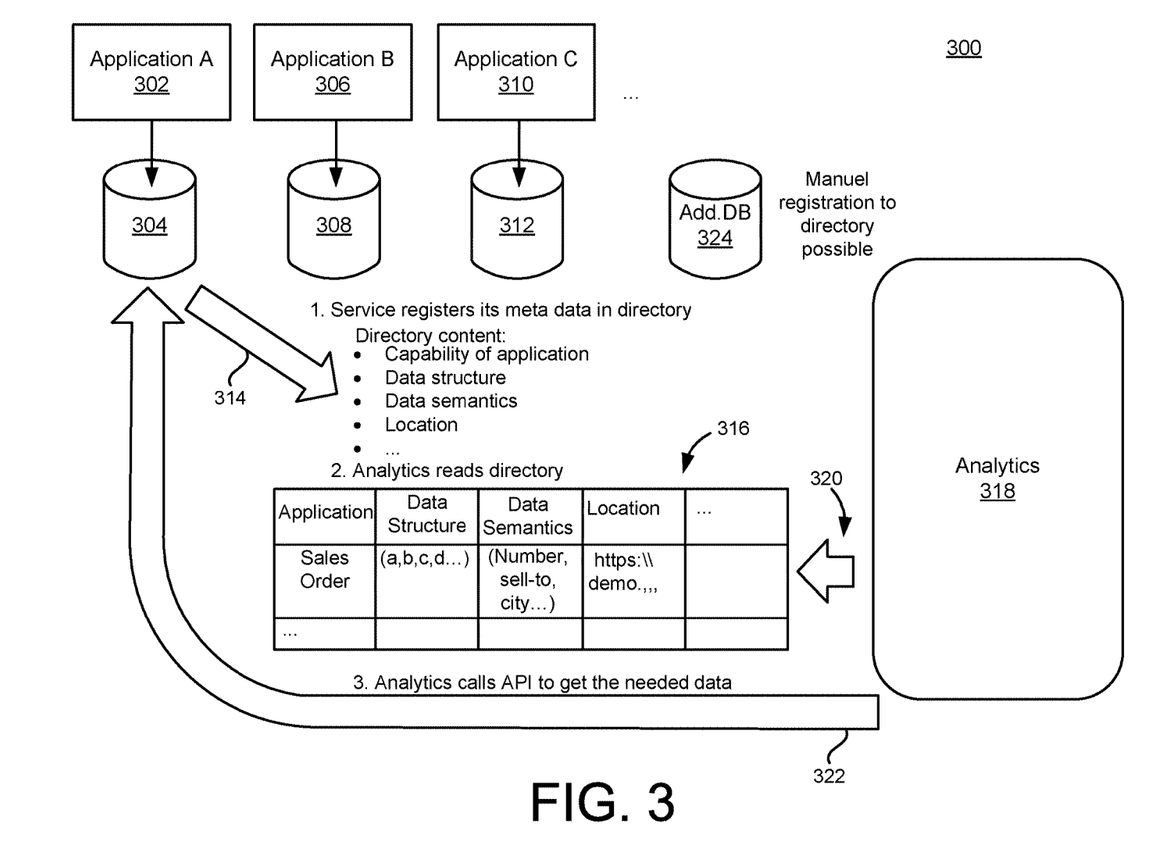
FIG. 3 is a block diagram of a more detailed example implementation of the example of FIG. 1.

FIG. 3 is a block diagram of a system 300 illustrating more detailed example implementations of the system 100 of FIG. 1. As such, FIG. 3 provides an example implementation of the type of cloud-focused, continuous delivery of new features/functions that may be enabled using the types of segregated internal algorithms and data structures typically implemented in conjunction with microservice architectures.

For example, in FIG. 3, a microservice application 302 is illustrated as utilizing corresponding microservice data 304, while a microservice application 306 similarly stores and utilizes separate microservice data 308. Further in FIG. 3, a microservice application 310 stores and utilizes microservice data 312. As already described, it may be difficult, impractical, or impossible for conventional analytics solutions to access one or more of the potentially relevant data stores 304, 308, 312, as each such data store are handled by its respective microservice 302, 306, 310. That is, as described above with respect to FIG. 1, although not specifically or explicitly illustrated in the example of FIG. 3, each of the microservice applications 302, 306, 310 are assumed for purposes of the example to offer only corresponding, standard microservice APIs for purposes of accessing respective, underlying data stores 304, 308, 312.

Therefore, in order to enable and allow holistic analytics across different microservices, including the microservice applications 302, 306, 310, and notwithstanding the decoupled release cycles and other autonomous aspects thereof, the system 300, in accordance with the principles of operation of the system 100 of FIG. 1, enables each of the microservice applications 302, 306, 310 to describe their respective available data 304, 308, 312, to thereby enable analytic solutions to leverage and utilize desired portions of such data when needed. Accordingly, each of the microservice applications 302, 306, 310 may be implemented as offering one or more APIs for enabling and understanding and consumption of available data structures in a holistic manner.

In the example of FIG. 3, registration (314) of metadata is implemented in conjunction with a microservice data directory 316. As may be understood from the above description of FIG. 1, and as illustrated in more detail in FIG. 3, such registration may include, for example, metadata characterizing a capability or capabilities of the corresponding microservice application, data structure and data semantics associated with the data of the microservice application, location information characterizing where to access desired data, and virtually any other metadata characterizing microservice data and/or use thereof for analytics purposes.

In the more detailed example of FIG. 3, the directory 316 is illustrated as a table in which columns include an application type or identifier, a data structure, data semantics, and location, as just referenced. In the example of the directory 316, the application is illustrated as a sales order (but could also include, e.g., a purchase order, employee directory, or virtually any other type of data), with a hypothetical data structure (A,B,C,D, . . . ), a data semantics specified hypothetically as (#,sell-to,city, . . . ), and a hypothetical location "https://demo . . . ". As would be appreciated from the above description of FIGS. 1 and 2, each of the microservice applications 302, 306, 310 may be configured and enabled to populate the directory 316 with metadata characterizing respective data 304, 308, 312.

At a later point in time, an analytics solution 318 may be utilized by an end user to perform a holistic analytics procedure for the microservice applications 302, 306, 310, and may therefore initiate a request (320) to the directory 316. In the example of FIG. 3, the analytics solution 318 may then utilize the thus-obtained metadata to issue a call to the type of service-agnostic data description API (i.e., various instances thereof) implemented at each of the microservice applications 302, 306, 310 (322). In the example of FIG. 3, each microservice application may implement an additional such API for each of its releases, describing which data is contained, and how the data can be accessed. In this way, as described, knowledge regarding the microservice data will stay with the microservice itself, thereby enabling the type of decoupled life cycle of updates typically implemented in microservice architectures, since the analytics solution 318 is not required to be aware of changes in each of the microservices at the time such changes occur.

Consequently, without requiring replicated data, the analytics solution 318 is provided with an ability to access original microservice data 304, 308, 312 directly, using the various access methods and dependencies obtained from the directory 316. Consequently, the analytics solution 318 is provided with current, meaningful, relevant data.

Further in the example of FIG. 3, an additional database 324 is illustrated to provide an example of manual registration to the directory 316. In such implementations, instead of relying on all connected microservices to implement the types of data description APIs described herein themselves, legacy systems may also be added by manually describing the data access methodologies and associated data structures. Although this additional technique may introduce a dependency risk of a requirement to change the manually-provided data description whenever the corresponding data structures change themselves, such manual registration nevertheless thereby facilitates and bridges the existence of both connected and not-yet connected microservices in the context of a holistic analytics solution.

Figure 4:
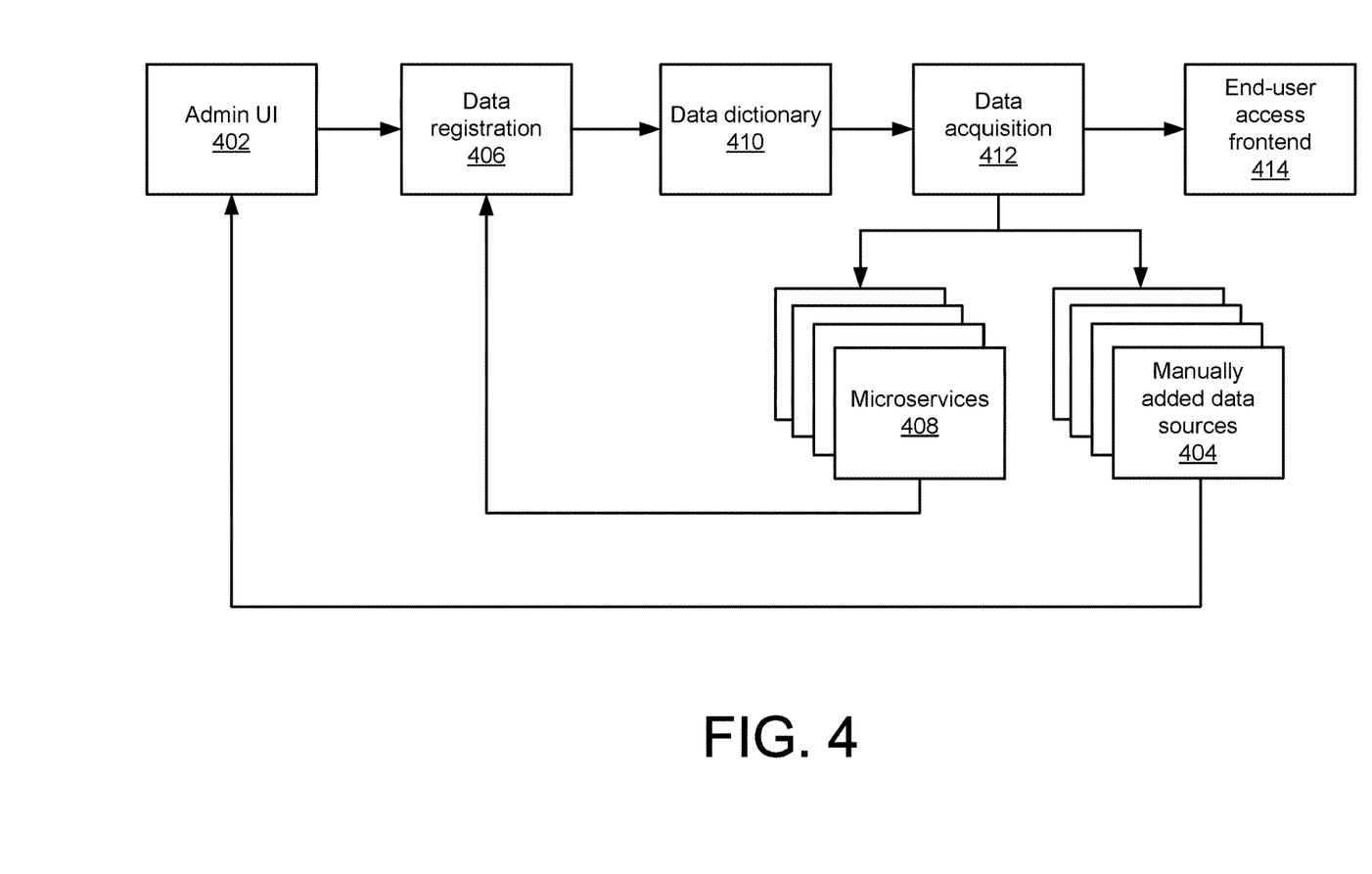
FIG. 4 is a block diagram illustrating a data flow used by an example implementation of the system of FIG. 1.

FIG. 4 is a block diagram illustrating a data flow used by an example implementation of the system of FIG. 1. In the example of FIG. 4, an admin UI 402 is illustrated as being used to receive manually added data sources 404, such as the data 324 of FIG. 3. That is, as shown, the admin UI 402 is used to add the manually-added data 404 as part of a data registration process 406 used to populate a metadata dictionary 410. Meanwhile, other microservices 408 may be equipped to execute data registration 406 with the metadata dictionary 410, as described above in conjunction with FIGS. 1-3.

At a later time, data acquisition 412 may proceed, based on data structure and access metadata retrieved from the metadata dictionary 410. That is, as shown, data retrieval from any specified one of the microservices 408 and the manually added data sources 404 may proceed, without requiring data replication outside of the various microservices.

Accordingly, an end-user access frontend 414 may be used to access the acquired data. Any appropriate, corresponding data analysis may be performed and displayed to the end user.

Figure 5:
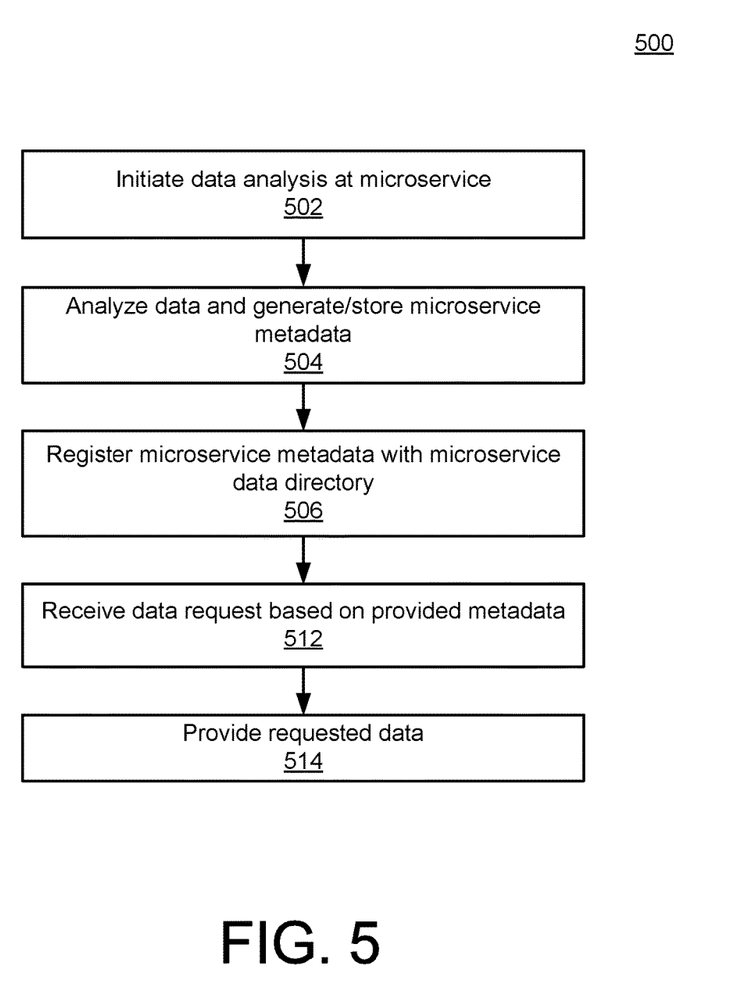
FIG. 5 is a flowchart illustrating example operations of a microservice of FIG. 1.

FIG. 5 is a flowchart 500 illustrating example operations of a microservice of FIG. 1. That is, FIG. 5 illustrates a technique(s) by which the data access mediator 120 populates the local metadata repository 124, and ultimately registers with, and contributes to, the microservice metadata directory 134.

In the example of FIG. 5, data analysis is initiated at a microservice (502). For example, the data analyzer 122 may be configured to analyze data in the microservice data repository 112 of the microservice 108. As referenced, such analysis may occur, for example, whenever the microservice 108 is released, re-released, or updated. Accordingly, the data analyzer 122 may proceed with analyzing the data of the microservice 108 and generating and storing the resulting metadata characterizing the data, e.g., in the metadata repository 124 (504).

The microservice metadata may then be registered centrally (506), e.g., with the microservice metadata directory 134. In various implementations, the metadata may be retained at the microservice 108 by an owner/administrator thereof, and/or at any other appropriate data store, or may be deleted once registration with the metadata directory 134 has been completed.

At a later time, a data request may be received from an analytics mediator (508), such as the analytics mediator 102. That is, a user of the analytics engine 104 may initiate some request for data analysis, and the analytics mediator 102 may then utilize the previously-registered metadata from the microservice metadata directory 134 to interface appropriately with the data-level interface 128. From the point of view of the data access mediator 120, it is thus possible to provide the requested data via the data level interface 128 (510), while still maintaining an independence (with respect to other microservices) of a manner in which data is stored within the microservice data repository 112.

Figure 6:
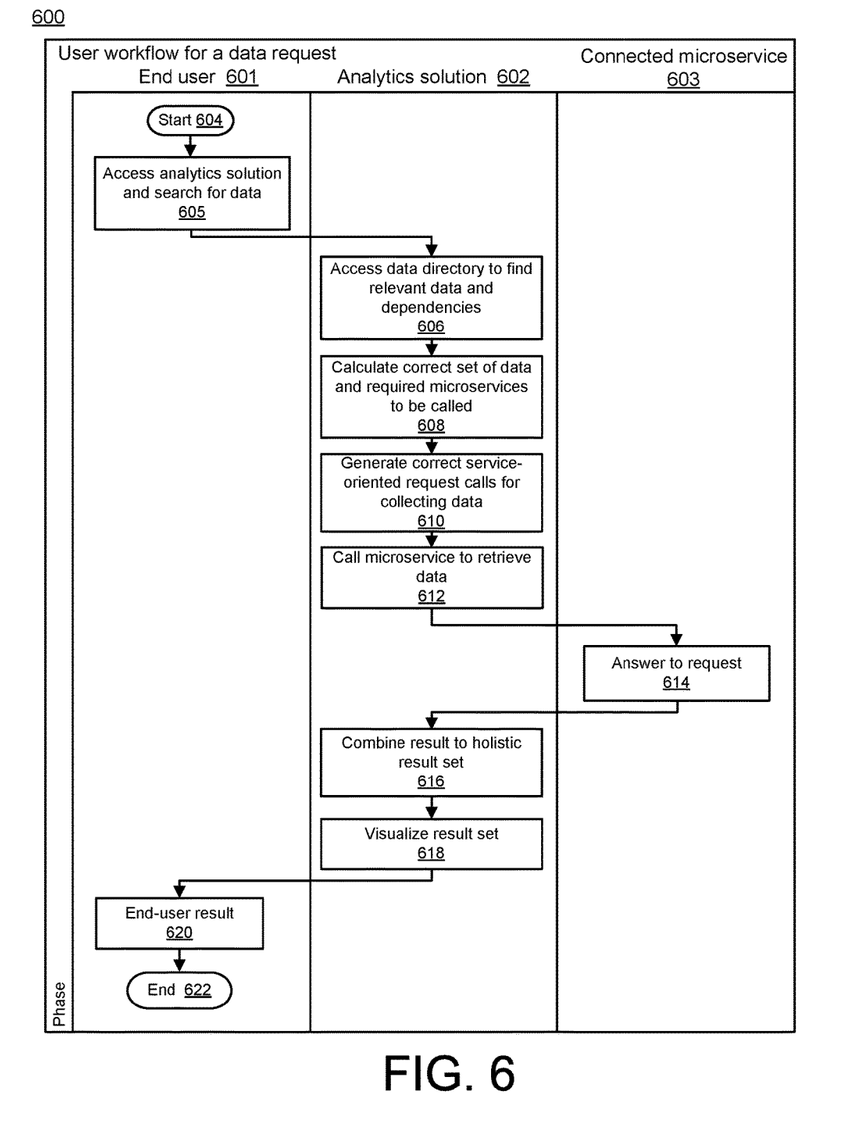
FIG. 6 is a flowchart illustrating additional example operations of an analytics mediator of FIG. 1.

FIG. 6 is a flowchart 600 illustrating additional example operations of an analytics mediator of FIG. 1. In the example of FIG. 6, a user workflow for a data request for an end user 601 is illustrated in conjunction with an analytics solution 602, such as the analytics mediator 102, and a connected microservice 603.

At a start 604, the analytics solution is accessed and a data search request(s) is received (605), e.g., from the analytics engine 104. The analytics mediator 102 may then access the metadata directory 134 to determine relevant data and dependencies (606). The analytics mediator 102 may then calculate a correct set of data and associated, required microservices to be called (608), and generate service-oriented request calls for collecting the desired data accordingly.

The analytics mediator 102 may then generate appropriate service-oriented request calls for collecting the desired, specified data (610). The analytics mediator 102 may then call each microservices to retrieve the necessary data therefrom (612), and the microservice, as described above with respect, e.g., to FIG. 5, may then satisfy this request (614).

Upon receipt of requested data, the analytics mediator 102 may combine the result into a holistic result set (616). Then, in this way, a final, combined result set may easily be visualized (618) and provided to the end user 602 (618), until the process is complete (620).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

receive a first registration request from a first microservice for registration within a microservice data directory of first data access metadata;

register the first data access metadata within the microservice data directory, in response to the first registration request;

receive a second registration request from a second microservice for registration within the microservice data directory of the second data access metadata;

register the second data access metadata within the microservice data directory, in response to the second registration request;

receive a data analytics request that requires first data of the first microservice and second data of the second microservice;

access the microservice data directory to obtain the first data access metadata characterizing a structure and access methodology for the first data of the first microservice, and the second access metadata characterizing a structure and access methodology for the second data of the second microservice;

obtain the first data of the first microservice using the first access metadata, and the second data of the second microservice using the second access metadata; and provide the first data of the first microservice and the second data of the second microservice to thereby respond to the data analytics request.

2. The computer program product of claim 1, wherein the instructions, when executed by the at least one computing device, are further configured to:

register the first data access metadata within the microservice data directory using a first directory interface of the first microservice; and register the second data access metadata within the microservice data directory using a second directory interface of the second microservice.

3. The computer program product of claim 1, wherein the first data access metadata and the second data access metadata characterize content of the first data and the second data, respectively.

4. The computer program product of claim 1, wherein the instructions, when executed by the at least one computing device, are further configured to:

obtain the first data of the first microservice using a first data-level interface of the first microservice, and the second data of the second microservice using a second data-level interface of the second microservice.

5. The computer program product of claim 1, wherein the instructions, when executed by the at least one computing device, are further configured to:

provide the first data and the second data to an analytics engine from which the data analytics request was received.

6. The computer program product of claim 1, wherein the microservice data directory receives a manual update including third access metadata characterizing a structure and access methodology for third data of a third microservice, and the third data is provided in response to the data analytics request.

7. The computer program product of claim 1, wherein the instructions, when executed by the at least one computing device, are further configured to:

analyze the analytics request to identify, from a plurality of microservices, the first microservice and the second microservice as including the first data and the second data required to satisfy the analytics request.

8. The computer program product of claim 1, wherein the instructions, when executed by the at least one computing device, are further configured to:

combine the first data of the first microservice and the second data of the second microservice to thereby respond to the data analytics request including facilitating a holistic analysis of an aggregation of the first data and the second data.

9. A method of executing instructions stored on a non-transitory computer-readable storage medium using at least one processor, the method comprising:

receiving a first registration request from a first microservice for registration within a microservice data directory of first data access metadata characterizing a structure and access methodology for first data of the first microservice;

registering the first data access metadata within the microservice data directory;

receiving a second registration request from a second microservice for registration within the microservice data directory of second data access metadata characterizing a structure and access methodology for second data of the second microservice;

registering the second data access metadata within the microservice data directory;

receiving a data analytics request that requires the first data of the first microservice and the second data of the second microservice;

accessing the microservice data directory to obtain the first data access metadata and the second access metadata; and obtaining the required first data of the first microservice and the second data of the second microservice including interfacing with the first microservice using the first data access metadata to obtain the first data of the first microservice and interfacing with the second microservice using the second data access metadata to obtain the second data of the second microservice to thereby respond to the data analytics request.

10. The method of claim 9, wherein the first data access metadata and the second data access metadata characterize content of the first data and the second data, respectively.

11. The method of claim 9, wherein obtaining the first data and the second data comprises:

obtaining the first data of the first microservice using a first data-level interface of the first microservice, and the second data of the second microservice using a second data-level interface of the second microservice.

12. The method of claim 9, further comprising:

providing the first data and the second data to an analytics engine from which the data analytics request was received.

13. The method of claim 9, further comprising:

combining the first data of the first microservice and the second data of the second microservice to thereby respond to the data analytics request including facilitating a holistic analysis of an aggregation of the first data and the second data.

14. A microservice comprising:

a microservice data repository configured to store data of the microservice;

a microservice application program interface (API) configured to interact with a second microservice API of a second microservice to thereby provide a combined functionality of the microservice and the second microservice; and a data access mediator configured to interface with an analytics mediator to register microservice metadata characterizing the data of the microservice with the analytics mediator, and further configured, based on a data request from the analytics mediator formulated in accordance with the microservice metadata, to provide requested data from the microservice data to thereby enable combined analysis of the requested data together with second data of the second microservice, wherein the data access mediator includes a metadata repository configured to store the microservice metadata characterizing a structure, access methodology, and content of the data of the microservice data repository, and a directory interface configured to register the microservice metadata with a microservice data directory storing the microservice metadata along with second microservice metadata characterizing a structure, access methodology, and content of the second data of the second microservice.

15. The microservice of claim 14, wherein the data access mediator comprises:

a data-level interface configured to receive the data request from the analytics mediator, access the microservice data repository, and return the requested data to the analytics mediator.

16. The microservice of claim 14, wherein the data access mediator implements a first instance of a service-agnostic interface to register the microservice metadata and respond to the data request, a second instance of the service-agnostic interface also being used by the second microservice to register second microservice metadata of the second microservice with the analytics mediator and provide the second data to the analytics mediator to enable the combined analysis.

* * * * *